United States Patent [19]

Suzuki et al.

[11] 4,406,557
[45] Sep. 27, 1983

[54] LINK ROD CONNECTOR

[75] Inventors: Yoshikazu Suzuki, Hiroshima; Takuo Yuda, Yokohama; Daiji Nakama, Chigasaki, all of Japan

[73] Assignees: Yushin Co., Ltd., Tokyo; Nifco Inc., Yokohama, both of Japan

[21] Appl. No.: 306,683

[22] Filed: Sep. 29, 1981

[30] Foreign Application Priority Data

Oct. 2, 1980 [JP] Japan .......................... 55-141462[U]

[51] Int. Cl.³ .......................... F16B 9/00; F16C 11/00; F16D 1/12
[52] U.S. Cl. ....................................... 403/71; 403/406
[58] Field of Search .................... 403/71, 291, 11, 21, 403/119, 405, 406; 24/217, 208 A

[56] References Cited

U.S. PATENT DOCUMENTS

| 3,628,816 | 12/1971 | Ross | 403/405 X |
| 3,679,249 | 7/1972 | Hoffmann | 403/71 X |
| 3,695,652 | 10/1972 | Ratnikas | 403/291 X |
| 3,988,906 | 11/1976 | Smith | 403/291 X |
| 4,286,642 | 9/1981 | Keatley | 403/406 X |
| 4,306,820 | 12/1981 | Nelson | 403/71 X |

FOREIGN PATENT DOCUMENTS

| 2611622 | 9/1977 | Fed. Rep. of Germany | 403/71 |
| 2391398 | 12/1978 | France | 403/405 |

Primary Examiner—Wayne L. Shedd
Attorney, Agent, or Firm—Trexler, Bushnell & Wolters, Ltd.

[57] ABSTRACT

A link rod connector is formed to have two sections connected by a resilient hinge and each section is provided with a semicylindrical leg portion having a resilient catch. In use, the sections are closed onto each other to retain a link rod therebetween in such a manner that the link rod is rotatable within the sections but cannot be extracted therefrom, and then the cylindrical leg formed by the semicylindrical leg portions is inserted into a hole in a link arm so that the link rod is rotatable with respect thereto.

6 Claims, 7 Drawing Figures

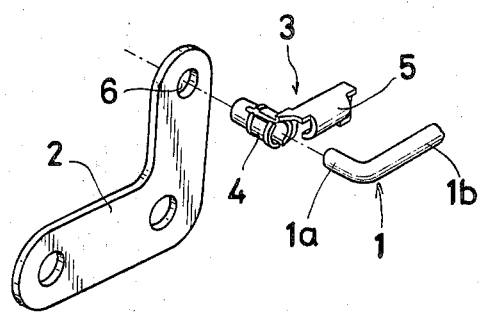
Fig_1 (PRIOR ART)
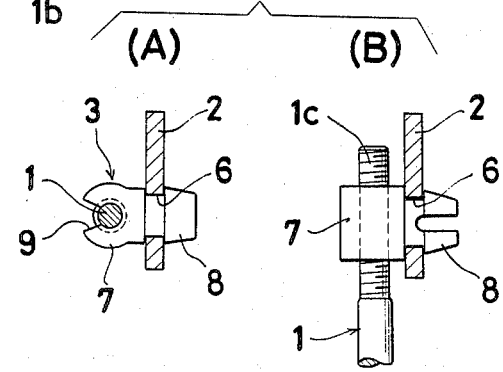
Fig_2 (PRIOR ART)
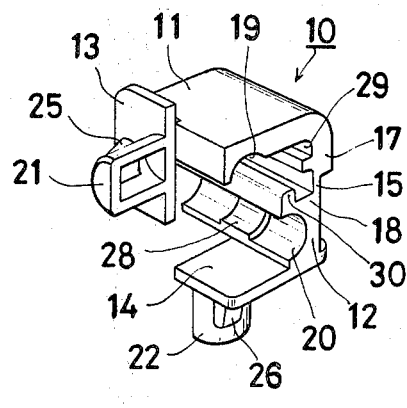
Fig_3
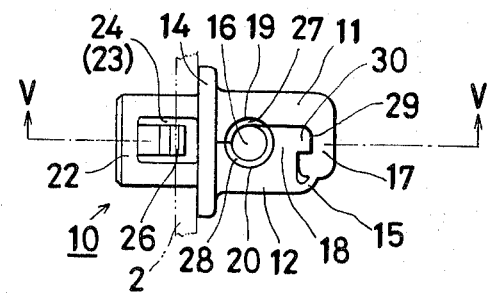
Fig_4
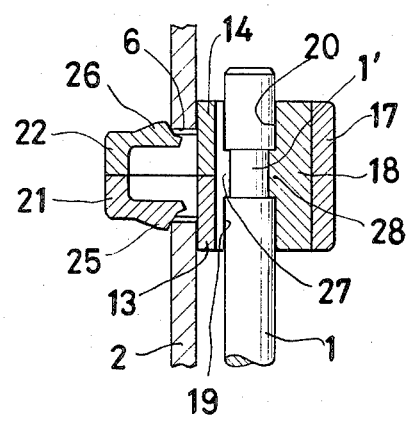
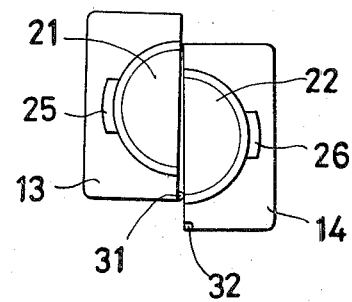
Fig_6

LINK ROD CONNECTOR

BACKGROUND OF THE INVENTION

This invention relates to a link rod connector and more particularly to a link rod connector for connecting a link rod at its one end to a link arm on the device to be operated and at its other end to a link arm on the member for operating the device so as to establish a mechanical connection for transmitting motion between the operating member and the device to be operated. The link rod connector according to this invention can be used, for example, in establishing a link for the transmission of motion between an automobile door lock mechanism and the outer or inner handle of the door.

Conventionally, the connection between a link arm and a link rod has been accomplished by bending the end of the link rod into the shape of the letter "L" and then using an L-shaped synthetic resin connector to connect the bent part of the link rod to the link arm in a manner which allows the link rod to rotate freely but not to be extracted from the connecting hole in the link arm. Another method that has been used entails the use of a synthetic resin connector having a nut portion. The connector is first rotatably attached to the link arm and then a threaded portion at the tip of the link rod is screw engaged with the nut portion of the connector.

In assembling link mechanisms of this type the procedure most commonly used is to first connect one end of the link rod to one or the other of the link arms for the operated device and the operating member and then to connect the other end of the link rod to the remaining link arm, whereafter the link arm is assembled into its associated device or member. Because of this, it is preferable to have a connector capable of retaining the link rod in connection with the link arm in a manner which allows the link rod to rotate with respect to the link arm but not to be extracted therefrom and, moreover, capable of permitting the link rod itself to rotate. In the conventional method first mentioned above, however, the only freedom of rotation allowed is between the link rod and the connector on the one hand and the link arm on the other, and no rotation of the link rod itself is possible. As a result, the work of assembling the link arms into their respective mechanisms is made complicated and it is impossible to adjust the effective linking length of the link rod. In the second mentioned method, the primary object is to permit adjustment of the effective linking length. Furthermore, as the link rod and the connector are rotatable with respect to the link arm and the link rod is itself also able to rotate, the work of assembling the link rod with the link arm is facilitated. However, with this method the effective length of the link rod is changed when the link arm is rotated about the axis of the link rod so that there is a danger that it may become impossible to obtain reliable transmission of the motion from the operating member to the operated device.

SUMMARY OF THE INVENTION

The object of this invention is to provide a link rod connector free from the above-described defects of conventional connectors which is capable of reliably retaining a link rod in a manner that allows the link rod to rotate, is easy to assemble with a link arm and is rotatable with respect to the link arm after assembly therewith.

The link rod connector according to the present invention consists of two sections connected by a resilient hinge so as to be freely openable and closable. The link rod is inserted between the sections when the connector is open and then the sections are closed onto each other to retain the link rod so as to be inextractable in its axial direction but rotatable about its axis. In its closed state, the connector has a cylindrical member on its bottom side for insertion into a hole in a link arm so as to be rotatable with respect to but inextractable from the link arm.

As the link rod connector according to this invention is rotatable with respect to the link arm and also rotatable with respect to the link rod, it provides a great deal of freedom in positioning and thus facilitates the work of assembling the link arm with its associated device or member. Moreover, the connector is simple in shape and can therefore be conveniently and economically molded as one body from synthetic resin.

The other objects and features of the present invention will be apparent from the detailed description given below with reference to the drawings.

BRIEF DESCRIPTION OF THE DRAWINGS

FIG. 1 is a perspective view showing the manner in which a link rod and a link arm are connected using one type of conventional connector.

FIG. 2(A) is a plan view partially in cross section showing the manner in which a link rod and a link arm are connected using another type of conventional connector.

FIG. 2(B) is a side view partially in cross section of the connecting arrangement shown in FIG. 2(A).

FIG. 3 is a perspective view showing an embodiment of the link rod connector in accordance with the present invention.

FIG. 4 is a plan view showing the connector of FIG. 3 as used to retain a link rod.

FIG. 5 is a cross sectional view taken along line V—V of FIG. 4 showing the link rod being retained by the connector.

FIG. 6 is an explanatory view showing the manner in which the leg portions of the connector shown in FIG. 3 assume a cylindrical configuration.

DESCRIPTION OF PREFERRED EMBODIMENT

Figure 7:
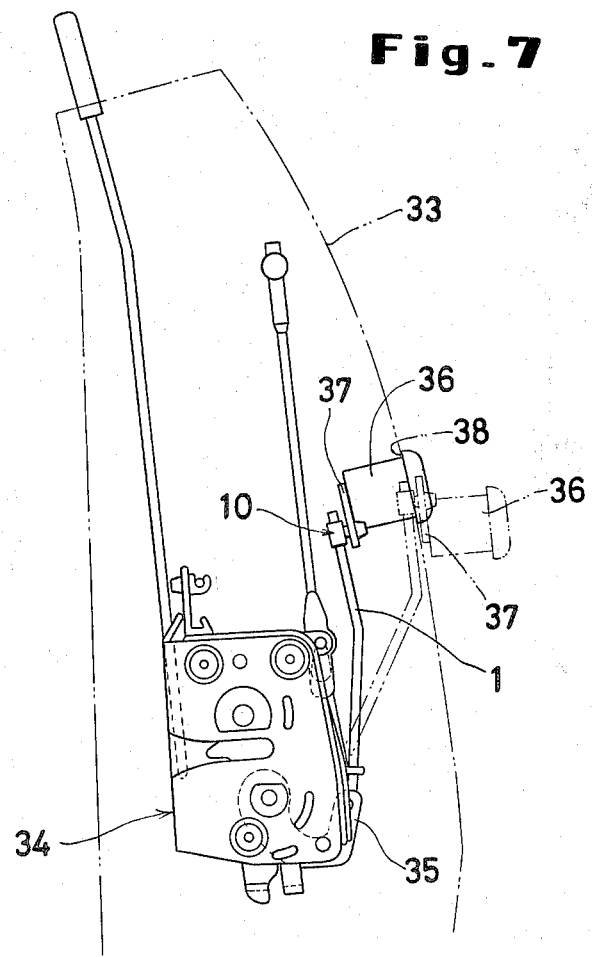
FIG. 7 is an explanatory view showing an example of how the connector according to the present invention is used to connect the link arm of an automobile key cylinder and a link rod.

An explanation will first be given with reference to FIG. 1 of the manner in which a link arm and a link rod are connected in accordance with the conventional method first referred to above. The tip of a link rod 1 is bent into the shape of the letter "L" and then a synthetic resin connector 3 formed as one body to have a cylindrical portion 4 for embracing the bent portion 1a and a retainer 5 provided at the rear of the cylindrical portion 4 perpendicularly thereto for retaining the axial portion 1b of the link rod is inserted by its cylindrical portion 4 into a hole 6 in link arm 2. Next the bent portion 1a of the link rod 1 is inserted into the cylindrical portion 4 and the axial portion 1b is retained by the retainer 5 using the resiliency of the synthetic resin from which the retainer is made. In this way the link rod 1 is retained in connection with the link arm 1 in a manner which allows it to rotate with respect thereto but prevents it from being extracted therefrom.

Next, an explanation will be given with reference to FIG. 2 of the manner in which a link arm and a link rod are connected in accordance with the second conventional method referred to above. In this method there is used a connector 3 comprising a link rod retainer 7 and a leg 8. The retainer 7 has an internally threaded retaining recess 9 for threadedly engaging a thread 1c provided at the tip of the link rod 1. After the leg 8 has been forced into a hole 6 in a link arm 2, the portion of the link rod 1 provided with the thread 1c is forced into the engaging recess 9 to connect the link arm and the link rod rotatably.

As was mentioned earlier, these known connectors are disadvantageous in that they complicate the assembly work or give rise to a change in the effective linking length of the link rod after the link arm and the link rod have been assembled.

An embodiment of the link rod connector according to the present invention will now be described with reference to FIG. 3 wherein the link rod connector is formed integrally of a plastic and denoted by the numeral 10. The link rod connector 10 consists of two body sections 11, 12 attached to each other at their tops 17, 18 by a thin resilient hinge 15 providing permissive hinging movement therebetween so as to be capable of opening away from each other to an open separated position or closing onto each other closed juxtaposition. In the closed state, the two sections 11, 12 combine to form a retainer (hole) 16 for retaining a link rod 1 as best shown in FIG. 4 and to form at the bottom portion thereof a flange and a cylindrical portion for attachment of the connector 10 in a hole 6 of a link arm 2. The division of the two sections 11, 12 is such that they meet to form the flange and cylindrical portion along a plane lying perpendicular to the axis of the link rod retained in the retainer 16.

The sections 11, 12 have semicircular depressions 19, 20 having diameters slightly larger than that of the link rod 1. The depressions 19, 20 have arcuate ridges 27, 28 provided midway of their axial length as shown in FIG. 3 and FIG. 4. When the two sections are brought together to retain the link rod 1 in the retainer 16, the arcuate ridges fit into a small diameter portion 1' provided on the link rod 1 in advance as shown in FIG. 5. By this arrangement, the link rod 1 is free to rotate within the retainer 16 but cannot be extracted therefrom. The top 17 of the J-shaped section 11 is made somewhat thick and a groove 29 is provided on the inner side of this thick portion. At the top 18 of the other section 12, on the other hand, there is provided a ridge 30 so situated that it will engage with the groove 29 when the two sections 11, 12 are closed onto each other. Thus when the connector 10 is closed over the link rod 1, the load exerted on the connector through the link rod is borne by the engagement between the groove 29 and the ridge 30 so as to prevent an excessive force from acting on and breaking the hinge 15.

The section 11 (12) is provided on half of its lower portion with a flange 13 (14) extending perpendicular to the longitudinal direction of the upper portion of the connector 10. The flange 13 (14) further has a semicylindrical leg portion 21 (22) projecting downwardly from its lower surface. The flanges 13, 14 and the semicylindrical leg portions 21, 22 assume symmetrically opposite positions to each other when the two sections 11, 12 are closed onto each so that the flanges 13, 14 combine to form a single large flange and the semicircular leg portions 21, 22 combine to form a cylindrical leg.

The semicylindrical leg portions 21, 22 are provided with U-shaped cut-out portions 23, 24 and resilient catches 25, 26 which slant progressively outwardly from the tip toward the root of the leg portions. When the connector is closed and the two semicylindrical leg portions 21, 22 are brought opposite one another to form a cylindrical leg and this leg is forced into the hole 6 in the link arm 2, these two resilient catches 25, 26 are first resiliently deformed inwardly making it possible for the cylindrical leg to pass through the hole and then, after thay have passed through the hole 6, the catches 25, 26 spring back to their original shape to engage with the surface of the link arm 2 at the edge of the hole 6. As a result, the connector 10 is fixed to the link arm 2 in its closed state with the surfaces of the arm 2 surrounding the hole 6 being caught between the catches 25, 26 and the flanges 13, 14. Thus, if the link rod 1 is caught in the retainer 16, the connector 10 will be retained in the hole 6 of the link arm 2 so as to be rotatable therein but inextractable therefrom.

As shown in FIG. 6, it is further possible to provide the edge of one of the flanges 13 with a small protrusion 31 and provide the other flange 14 at a corresponding position with a small notch 32 so that when the two sections 11, 12 are closed to retain the link rod, the small protrusion 31 will engage with the small notch 32 to hold the two sections in their closed condition.

Referring next to FIG. 7, the manner in which the link rod connector 10 of the structure described above is used within an automobile door panel 33 to fasten a link rod 1 between the link arm 37 of a door lock mechanism 34 and a key cylinder 36 (the operating member). For simplicity of explanation, it will be presumed that one end of the link rod 1 has already been connected to a link arm 35 of the door lock mechanism 34 using the link rod connector according to this invention.

First the sections 11, 12 of the connector 10 are opened at an angle of 90° (FIG. 3) and the connector is positioned with respect to the free end of the link rod 1 so that the arcuate ridge 27 in the depression 9 of the section 11 faces the small diameter portion 1' of the link rod 1. Next the other section 12 is bent to bring the ridge 30 of the section 12 into engagement with the groove 29 of the section 11 thus bringing the two sections into their closed state. At this point, the small protrusion 31 provided on the flange 13 will have come into engagement with the small notch in the flange 14 so that the connector 10 will be attached to one end of the link rod 1 in such a manner that it can be rotated thereon but cannot be extracted therefrom. Next the cylindrical leg formed by the semicylindrical leg portions 21, 22 extending from the flanges 13, 14 is inserted into a hole in the link arm 37 thus causing the resilient catches 25, 26 to be deformed inwardly. Upon complete insertion, the catches snap back thus catching the surface of the link arm in the vicinity of the hole between the catches 25, 26 and the flanges 13, 14 (FIG. 5). In this state, the connector 10 cannot be extracted from the link arm in either direction but is rotatable with respect to the link arm.

Next the link arm 37 to which the link rod 1 has been connected by means of the connector 10 is connected to the key cylinder 36. In order to facilitate this work, the link arm 37 is connected to the key cylinder outside the door panel 33. For this purpose, the link arm 37 is rotated around the connector 10 and temporarily drawn outside the door panel 33 through a hole 38 for insertion of the key cylinder (dotted line in FIG. 7). Then, working outside the door panel 33, the link arm 37 now drawn through the hole 38 is connected with the key cylinder 36. After this connection is completed, the link arm 37 which has been connected to the key cylinder 36 is again inserted within the door panel 33 and the key cylinder 36 is fitted into the hole 38. During this operation, the link rod 1 connected to the link arm 37 by the connector 10 is free to rotate about its axis and as a consequence, not only is the link arm free to rotate about the link rod but the connector is also free to rotate with respect to the link arm. This results in a great deal of freedom of movement and much facilitates the assembly work.

Also, when it is desired to extract the connector 10 from the hole in the link arm 37, this can be easily accomplished by inwardly deforming the resilient catches 25, 26 on the cylindrical leg prior to pulling the leg out of the hole.

Even if the link rod should exert a force on the connector 10 in such a way that the joined sections 11, 12 tend to be pried apart, the connector will not open and permit the link rod to escape since the sections 11, 12 are held together by the engagement with the hole in the link arm.

In the above described embodiment, the depressions 19, 20 forming the retainer 16 are each provided at one central portion thereof with a single ridge 27 or 28. The number of ridges provided is, however, not limited to one each and two or more ridges may be provided insofar as a corrsponding number of small diameter portions are provided on the tip of the link rod. Also, although in the example described above, the connector 10 was connected to the link arm 37, it is possible instead to connect it to the link arm 35 of the door lock mechanism 34 or to connect connectors 10 to both the link arm for the door lock mechanism and the link arm for the key cylinder. Moreover, the connector 10 can also be used for connecting other operating members than a key cylinder with the door lock mechanism.

In the above example, a detailed description was given of the use of the connector according to this invention for establishing mechanical linkage between an automobile door lock mechanism and its operating member (with a key cylinder being used as one example). It goes without saying, however, that the connector is generally usable for connecting link arms to link rods in any linkage mechanism wherein a link arm on a device to be operated is connected with a link arm on an operating member so as to make it possible to operate the device by means of the operating member from a remote location.

As is clear from the explanation given above, according to the link rod connector of the present invention, the two sections are closed onto each other with the link rod retained in the retainer and this state is maintained by an arrangement that provides provisional fastening. Thus the connector can easily be connected to the link arm and once it has been connected thereto the two sections can no longer open since they are held together by the engagement of the cylindrical leg formed of the two leg portions with the hole in the link arm. As a result, the link rod is securely held within the retainer. Moreover, as the retainer retains the entire circumference of the link rod so as to be inextractable in the axial direction but rotatable about its axis and in addition the connector is rotatable with respect to the link arm, the degree of freedom of motion provided by the connector is very large. Therefore, the efficiency of the assembly work is enhanced when the assembly procedure calls for the link rod and the connector to be assembled first and the connection between the connector and the link arm to be made later. What is more, the connector has the additional advantage that it is capable of compensating for imprecisions in the relative positioning of the link arm with respect to the surface of attachment of the connector and the periphery of the link rod even after assembly has been completed so that it is effective in reducing operating load.

Still further, since the connector is formed of two sections connected to each other by a resilient hinge, it can be molded as one body of a synthetic resin and is therefore adaptable to mass production.

What is claimed is:

1. A link rod connector for connecting a link rod to link arms and formed integrally of plastic; and comprising a pair of body sections; a resilient hinge connecting the tops of said body sections for permissive hinging movement thereof between an open separated position and a closed position with the body sections in juxtaposition, and the body sections in closed juxtaposition providing rod retainer means securing the rod against axial extraction thereof with permissive rotation thereof about its axis, and a pair of semicylindrical leg portions, one at the bottom of each of the body sections, such that the body sections in closed juxtaposition present the leg portions as a cylindrical member which is inserted through a hole in the link arm and maintained against extraction while permitting rotation thereof relative to the link arm.

2. The link rod connector according to claim 1, wherein the retainer means is provided with ridges on its inside surface.

3. The link rod connector according to claim 1, wherein the semicylindrical leg portions are provided with resilient arm engaging catches projecting upwrardly and outwardly from the lower portions thereof.

4. The link rod connector according to claim 1, wherein the semicylindrical leg portions project from flanges provided on the lower surfaces of the body sections.

5. The link rod connector according to claim 4, wherein the flanges are provided with means that come into engagement when the body sections are closed.

6. The link rod connector according to claim 1, wherein one of the body sections is provided at the top thereof with a groove and the other body section is provided at the top thereof with a ridge which engages with the groove when the sections are closed prior to position.

* * * * *